United States Patent Office.

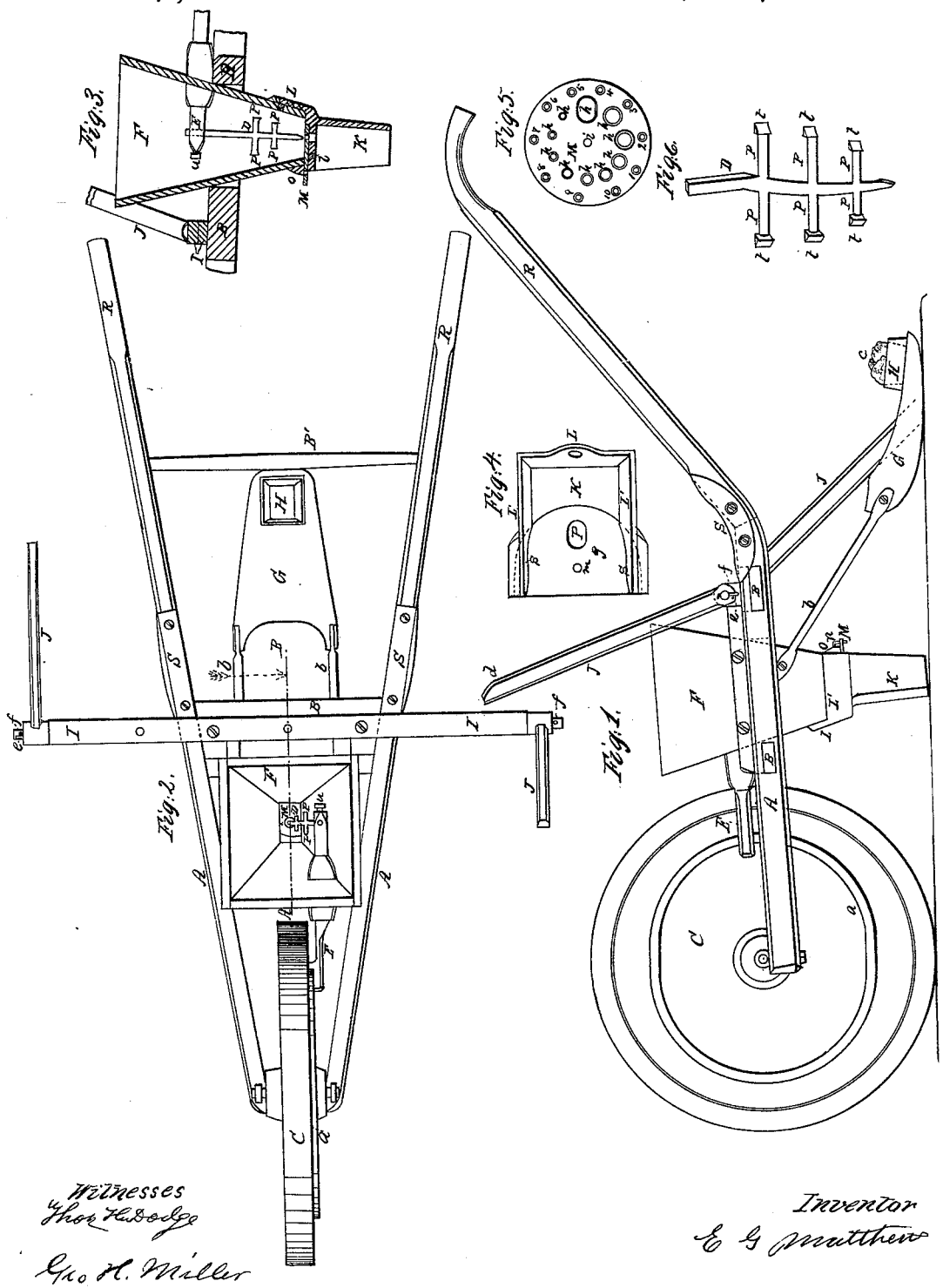

E. G. MATTHEWS, OF NEWTON, ASSIGNOR TO F. F. HOLBROOK, OF DORCHESTER, MASSACHUSETTS.

*Letters Patent No. 91,143, dated June 8, 1869.*

IMPROVEMENT IN SEED-PLANTERS.

The Schedule referred to in these Letters Patent and making part of the same.

*Know all men by these presents:*

That I, E. G. MATTHEWS, of Newton, in the county of Middlesex, and Commonwealth of Massachusetts, have invented certain new and useful Improvements in Seed-Planters; and I do hereby declare that the following is a full, clear, and exact description of the same, reference being had to the accompanying drawings, forming part of this specification, in which—

Figure 1 represents a side view of my improved seed-planter;

Figure 2 represents a plan or top view of the same;

Figure 3 represents a section of a part of the machine, on line A B, fig. 2;

Figure 4 represents a top or plan view of the conductor, or opening-plow detached;

Figure 5 represents a bottom or under-side view of the seed-dial detached; and

Figure 6 represents a side view of the stirrer-device.

To enable those skilled in the art to which my invention belongs, to make and use the same, I will describe it more in detail.

In the drawings—

A A are the side-pieces of the main frame, which are secured together by means of cross-pieces B B B'.

Between the front ends of the side-pieces of the main frame is supported the main wheel C, having a cam-flange, $a$, which gives motion to the stirrer D, by means of the slide E.

To the sides of the rear lower end of the hopper-box F are hinged the forward ends of the connections $b\ b$, the rear ends of said connections being hinged to the seed-coverer G, which is provided with a weight-receptacle, H, whereby its weight or pressure upon the ground can be increased or diminished, by adding to or removing the weights $c$ from said receptacle.

To the upper sides of the side-pieces A A are secured the adjustable arms I I, the outer ends of which form journals for the marking-arms J J, the under sides and lower ends of which are made bevelling, as shown at D, whereby, when said markers are down on the ground, they open the earth and make a straight and distinct mark or furrow, which is not the case when chains are used, especially when planting upon side-hills.

To retain the markers in elevated positions, a small pin, or screw, $e$, is inserted in the upper end of each, which strikes against the lower end of the pin $f$, when the marker is turned up, as shown in fig. 1, thereby retaining the latter in an elevated position.

The conductor and opening-plow K is cast with front and side-flanges L L', and with a depressed part, $g$, for the reception of the dial-plate M, which is cast with a series of seed-holes, $h$, and a series of index-holes, 1, 2, 3, &c.

It is also cast with a projection, $i$, which answers for a pivot to the dial-plate, and fits the hole $m$, in the depressed part $g$.

A hook, $n$, is hinged to the back piece $o$, so that it can be hooked into either one of the index-holes, for holding the dial-plate in position. For instance, when the dial-plate is turned, so that the hook can be pressed into the hole 10, the largest seed-hole will be brought directly under the opening in the bottom of the hopper, and above the hole $p$, in the depressed part $g$ of the conductor. Any other sized hole may, in like manner, be set for use.

The inner lower edges of the flanges L L' project in over the depressed part $g$, as indicated in dotted lines, fig. 4, for the purpose of retaining the dial-plate in position.

The dial-plate M is slipped in under the projections $s$, on the flanges L L', from the rear open side, the dial being sprung up sufficiently to allow the pin to slide over on top of the depressed part $g$, until its fulcrum-pin, or projection $i$, slips into the hole $m$, when the conductor is secured to the bottom of the hopper, as indicated in the drawings.

It will be seen, that by making the top of the conductor in the manner shown and described, the dial-plate can be attached in a very convenient manner, and that, too, without the use of rivets, or the interposition of extra pieces between the conductor and hopper and dial.

Then, again, by casting the dial with the seed and index-holes, and with a projection, $i$, for a fulcrum-pin, or journal, a more perfect dial is obtained than can be produced by the usual mode of stamping them out of sheet-metal, while, at the same time, they can be produced at a price tenfold less.

In fig. 6, the stirrer-device D is shown upon an enlarged scale.

The arms P are provided with projections $t$, of wedge-shape, on their outer ends, but square on their inner ends, whereby, when the stirrer D is moved back and forth through the seed, by means of the slide E, the projections $t$, on the ends of the arms P, will alternately draw the seed toward the centre of the hopper, thereby preventing the seed from bridging over the hole in the seed-dial.

Any desired number of arms, P, may be employed, and the inner shoulders of the projections $t$ may extend from the bottom, top, and both sides of the arms, as shown in fig. 6, or they may extend only from the bottom and top, as shown in fig. 3.

The upper end or shank of the stirrer D is held in place, in the end of the slide E, by a set-screw, $u$.

In some localities it is not convenient to make the front part of frame A of metal, while, at the same time, it is inconvenient and expensive to make the handles R R, and their respective side-pieces, from the same piece of wood.

To obviate the foregoing objections, and also to enable the manufacturer to pack the machines in a small compass, for storage or transportation, I make the handles R and side-pieces A from separate pieces of wood, and join them together by means of the curved clamp-pieces S, as shown in the drawings.

The dial-plate M, combined with the hopper and top of the conductor, in the manner shown, makes a seed-dropping device more simple and effective than any other heretofore in use.

In addition to the seed and index-holes, the figures shown in fig. 5 are also cast with the dial-plate.

The coverer G may be combined with the cross-piece B', by means of adjustable connections, or fastenings, so that it can be raised above the ground, and retained in such elevated position while the machine is being moved from field to field, or for any other purpose.

Having described my improvements in seed-planters, What I claim therein as new and of my invention and desire to secure by Letters Patent, is—

1. The combination, with the markers J and arms I I, of the pins *e* and *f*, substantially as and for the purposes set forth.

2. The conductor, or opening-plow K, made substantially as and for the purposes set forth.

3. The combination, with the hopper and conductor, of the seed-dial plate, substantially as and for the purposes set forth.

4. A seed-dial plate, constructed in the particular manner above described, in combination with the hopper, substantially as and for the purposes set forth.

5. The stirrer D, substantially as and for the purposes set forth.

6. The combination, with the pieces A A and handles R R, of the curved joint-pieces S S, as shown and described.

E. G. MATTHEWS.

Witnesses:
THOS. H. DODGE,
GEO. H. MILLER.